March 13, 1928.
A. B. MUNTYAN
1,662,075
ELECTROLYTIC RECTIFIER
Filed Oct. 15, 1924
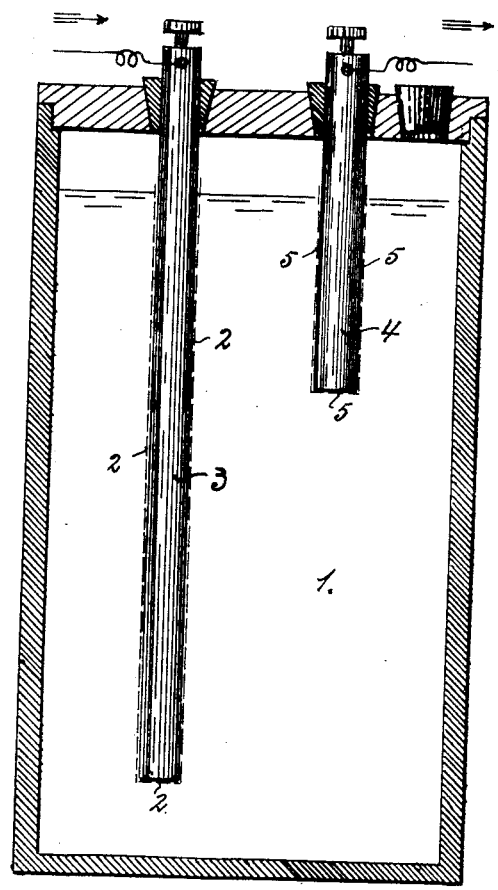
Adalbert Béla Muntyan.
Inventor
By S. Sokal
Attorney.

Patented Mar. 13, 1928.

1,662,075

UNITED STATES PATENT OFFICE.

ADALBERT BÉLA MUNTYAN, OF AMSTERDAM, NETHERLANDS, ASSIGNOR OF ONE-HALF TO GEORGE ERNST FISCHER, OF AMSTERDAM, NETHERLANDS.

ELECTROLYTIC RECTIFIER.

Application filed October 15, 1924, Serial No. 743,813, and in the Netherlands October 19, 1923.

In the known electrolytic current rectifiers, the metal electrode which stops the current, is after a short time, attacked or corroded by the electrolyte. When this stage is reached and the electrode is corroded, a galvanic element is set up owing to the fact that the anode and the cathode consist of different metals. Rectifying action of the rectifier ceases and the electrode stopping the current is consumed. The known aluminium cells in which both electrodes consist of aluminium are not rectifiers in the strict sense of the term, as they merely produce a phase displacement of the alternating current.

The present invention consists in an electrolytic current rectifier comprising in combination: an electrolyte; electrodes of aluminium comprising anode and cathode members immersed in said electrolyte; and metallic oxide coatings of different thicknesses formed on said anode and cathode members by treatment while they are outside said electrolyte, said coated anode and cathode members having when in the electrolyte a constant difference of electrical capacity from one another per unit area of surface such that they possess the correct capacities corresponding to the strength of current for which the rectifier is constructed, remain unaltered, and are enabled to operate so as to transform the alternating current supplied directly into continuous current. Each electrode being provided before immersion in the electrolyte with a metallic oxide layer thereby constitutes in conjunction with the electrolyte an electrical condenser in which the metal of the electrode forms the one conductor, the layer of the oxide the dielectric and the electrolyte the other conductor. Each electrode thus possesses an electrical capacity. According to the invention the electrodes and the layers of oxide are so constructed that the electrical capacity of the anode is considerably greater than that of the cathode.

A rectifier of this kind may be connected to an alternating current supply having a tension of say 220 volts either direct or through the intermediary of a transformer. It converts the alternating current into direct current of the required tension and intensity suitable for charging accumulators or secondary batteries. The efficiency is high and depends on the magnitude of the electrode capacities.

The accompanying drawings show diagrammatically by way of example one construction of a rectifier made according to the invention.

The electrolytic rectifier comprises two or more aluminium electrodes possessing unipolar conduction. Before the electrodes are introduced into the electrolyte, they are each coated with a film or layer of a metallic oxide. The metallic oxide films or layers on different electrodes are of different natures and of different thicknesses, as a consequence of which facts the electrical capacities of the electrodes are different. In the example shown in the drawing the anode 3 must possess a larger electrical capacity than the cathode 4. After the electrodes have been coated they are immersed in an electrolyte, such as, for example $H_3AsO_4$.

The formed metal oxide layer 2 of the anode 3 prevents contamination of the electrolyte 1. As the anode 3 and the cathode 4 are made of the same kind of metal, namely aluminium, there is no possibility of the cathode 4 becoming decayed or corroded. The formed anode 3 must possess a considerably larger capacity than the formed cathode 4 in order to produce a sufficient continuous current from the anode 3 to the cathode 4.

The cathode 4 made of aluminium is coated with a metal oxide layer which stops the current. The metallic oxide layer is reduced in the electrolyte by the hydrogen which is formed in the electrolyte. The reduction takes place until the di-electric 5 constituted by the layer is so thin that a large continuous electric current is passed.

I claim:

An electrolytic current rectifier comprising in combination: an electrolyte; electrodes of aluminium comprising anode and cathode members immersed in said electrolyte; and metallic oxide coatings of different thicknesses formed on said anode and cathode members by treatment while they are outside said electrolyte; said coated anode and cathode members having when in the electrolyte a constant difference of electrical capacity from one another per unit area of surface such that they possess the correct capacities corresponding to the strength of current for which the rectifier is constructed, remain unaltered, and are enabled to operate so as to transform the alternating current supplied directly into continuous current.

In testimony whereof I have hereunto set my hand.

ADALBERT BÉLA MUNTYAN.